April 14, 1970   L. R. PALLAT   3,506,809
SPEED AVERAGING CIRCUIT
Filed Feb. 21, 1967   4 Sheets-Sheet 1

INVENTOR.
LUDWIG R. PALLAT
BY *James N. Dresser*
ATTORNEY

April 14, 1970 L. R. PALLAT 3,506,809
SPEED AVERAGING CIRCUIT
Filed Feb. 21, 1967 4 Sheets-Sheet 2

INVENTOR.
LUDWIG R. PALLAT
BY James N. Dresser
ATTORNEY

INVENTOR.
LUDWIG R. PALLAT
BY James N. Dresser
ATTORNEY

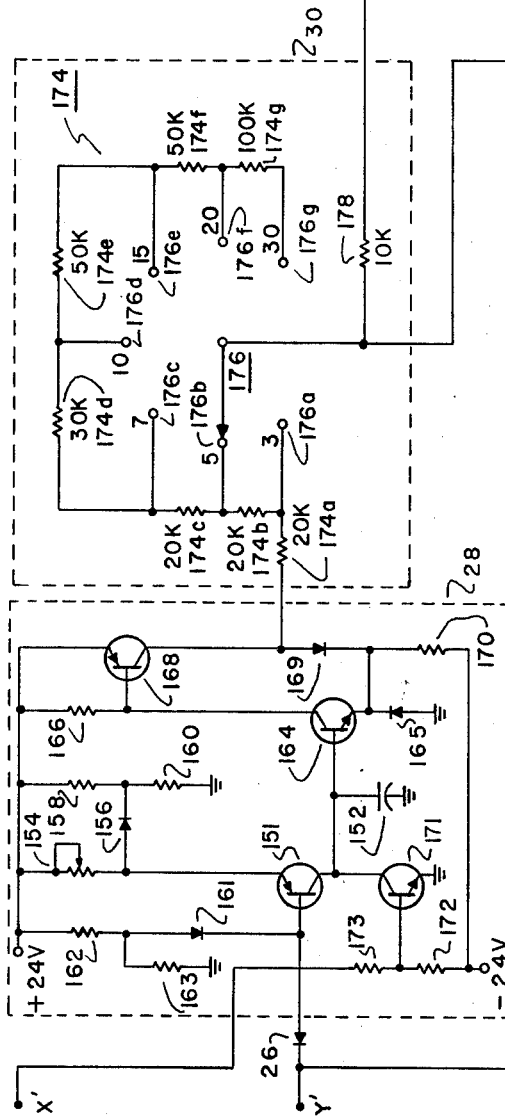

United States Patent Office 3,506,809
Patented Apr. 14, 1970

3,506,809
SPEED AVERAGING CIRCUIT
Ludwig R. Pallat, Rochester, N.Y., assignor to LFE Corporation, Waltham, Mass., a corporation of Delaware
Filed Feb. 21, 1967, Ser. No. 617,555
Int. Cl. G06f 15/48
U.S. Cl. 235—150.24
10 Claims

ABSTRACT OF THE DISCLOSURE

A speed averaging circuit adapted for use with vehicle detection devices of the type which generates a pulse with a duration inversely proportional to the speed of the detected vehicle. The pulse duration is inverted to give a voltage pulse of duration directly proportional to vehicle speed. This pulse duration is converted to a voltage level which is then averaged with a stored voltage level representing the average speed of preceding vehicles.

BACKGROUND OF THE INVENTION

This invention relates to a speed averaging circuit. More particularly this invention relates to a circuit for providing an indication of the average speed of a number of vehicles which have passed a vehicle detector that generates a pulse during the time a vehicle is within its detection zone.

Control of modern highways and city streets requires continuous availability of information about the traffic flow on the highways or streets. In urban areas, the arterial streets which carry a large amount of the city traffic are controlled at periodic intervals, usually at intersections with other streets, by means of traffic control signals or "stop lights." A series of such traffic control signals located at various intervals along the streets can be synchronized to operate in a timed sequence which results in efficient traffic flow and which thereby reduces or eliminates traffic congestion. Optimum control and synchronization of a series of such traffic control signals requires information about the speed at which traffic is moving on the street. In addition, systems are being built to control the entrance of traffic onto limited-access highways which pass into or through urban areas in an endeavor to improve the traffic flow on such highways. These traffic control systems require information about the speed of traffic on the limited-access highway.

Numerous types of vehicle detectors are used along streets and highways to provide traffic flow information as inputs to control systems which synchronizes traffic control signals on these streets and highways. Many of these vehicle detectors are of a type which provides an output pulse during the time that a vehicle is within the detection zone of the detector, commonly referred to as a vehicle presence detector. Typical of such vehicle presence detectors are inductive loop detectors, such as a wire loop and a LD–1 Loop Vehicle Detector manufactured by Automatic Signal Division of Laboratory for Electronics, Inc. and described in that company's LD–1 Loop Vehicle Detector Bulletin D–168, copyright 1966. Other vehicle presence detectors include sonic detectors, such as that disclosed and claimed in copending application Ser. No. 551,692, by Bernard J. Midlock, entitled Sonic Vehicle Detector, filled May 20, 1966, now U.S. Patent No. 3,362,009, and dassigned to the same assignee as the present invention. Numerous other vehicle detectors are available which provide an output pulse during the time a vehicle is within their detection zone.

If two identical vehicles pass one behind the other through the detection zone of a vehicle presence detector, the duration of the corresponding two output pulses from the detector are proportional to the length of time the respective vehicles are within the detection zone of the detector. For a given vehicle, the vehicle presence detector output pulse is of a duration inversely proportional to the speed of the vehicle as it passes through the detection zone. This output pulse duration can therefore be interpreted as an indication of the vehicle speed. However, since not all vehicles are of the same size and shape, the duration of the output pulse from a vehicle presence detector varies, even when vehicles pass through its detection zone at the same speeds. For example, a long vehicle, such as a large truck or a bus, is within the detection zone for a longer period of time than a shorter vehicle, such as an automobile, travelling at the same speed. Large automobiles, such as station wagons, cause output pulses of a longer duration than do small compact automobiles travelling at the same speed. Tall or wide vehicles remain within the detection zone of many types of vehicle presence detectors longer than do low and narrow vehicles of the same length travelling at the same speed. Thus, numerous errors occur in the individual speed indications obtained from a vehicle presence detector.

Although a large number of vehicles of various sizes and shapes, travelling past a vehicle presence detector at the same speed, results in output pulses of various durations from the detector, these output pulse durations tend toward an average value for any given speed. Thus, if the vehicles speed indications received via a vehicle presence detector are averaged for a number of closely spaced vehicles, then the accuracy of the resulting speed indication is increased.

Vehicle speed information in the form of pulses with duration inversely proportional to vehicle speed can also be obtained by use of two vehicle passage detectors placed a known distance apart along a roadway. One type of vehicle passage detector suitable for this use is the well-known pressure sensitive vehicle detector, such as the model HR manufactured by Automatic Signal Division of Laboratory for Electronics, Inc., and described in that company's Model HR & HRD Pressure Sensitive Vehicle Detector Bulletin D161, copyright 1957 by Eastern Industries, Inc., predecessor in title to Laboratory for Electronics, Inc. Two such pressure sensitive vehicle detectors placed a known distance apart can be connected to electrical circuitry which causes a bistable multivibrator to assume its set condition each time a vehicle passes over the first detector and to assume its reset condition when that vehicle passes over the second detector. The duration of the set output from the multivibrator is then inversely proportional to the speed of the vehicle as it passes the two detectors. This vehicle speed indication is not so subject to vehicle length errors as is the output pulse duration from a vehicle presence detector.

While the main group of vehicles travelling along a street or roadway may be moving at a moderate speed, individual vehicles, particularly at one end or the other of the main group, may be moving at speeds significantly greater than or less than the speed of the main group. Even within the main group of vehicles, individual vehicle speeds vary somewhat. Synchronization of a series of traffic control signals and control of limited-access roadway entrance ramps can best be achieved by utilizing information indicative of the average speed of vehicles travelling on the street or roadway rather than by utilizing individual vehicle speed indications.

Since the pulse durations obtained from use of a vehicle presence detector or from use of two vehicle passage detectors are inversely proportional to the speeds of the corresponding vehicles, averaging of these pulse durations themselves is not the same as averaging the speeds of the vehicles. To obtain an average speed indication, the individual speed indications which are averaged must be directly proportional to the vehicle speeds. If such directly proportional vehicle speed indications are available, true averaging of them is not required to increase the accuracy of the resulting speed indication. Mixing an individual vehicle speed indication with a known amount of an indication of the speed of closely spaced preceding vehicles, while not a true averaging process, increases the speed indication accuracy.

Circuits are known which provide the average of speed indication applied to them in pulse form. One variety of these prior art circuits is designed to provide an average speed indication from pulses which are directly proportional to the speeds of the corresponding vehicles. Accordingly, circuits of this variety merely average the pulse indications applied to them.

Another variety of prior art circuit is capable of providing a space means speed indication by simply averaging pulse durations which are inversely proportional to speed. Signals obtained from such circuits are inversely proportional to speed. Accordingly, the low speed signals are spread over a wide range of values, but the high speed indications are closely bunched within a small range. Consequently, the high speed indications are difficult to distinguish, and utilizing equipment to which these high speed indications are applied can not be accurately adjusted. On limited-access highways and on many arterial streets within urban areas, traffic moves at relatively high speeds. Signals inversely proportional to those speeds therefore fall within a limited range and are subject to inaccuracies. Use of such signals in a traffic control system limits the accuracy of such a system. Speed indications which increase linearly with increasing speed can be read with greater accuracy over all speed ranges than can indications which are inversely related to speed. Consequently, these linear speed indications permit improved traffic control.

SUMMARY OF THE INVENTION

The present invention is a circuit adapted to receive input pulses obtained by means of a vehicle presence detector or by means of two vehicle passage detectors. The duration of each of these pulses is inversely proportional to the speed of the vehicle that has passed the detector or detectors to cause the pulse. The present invention inverts this pulse duration to give a voltage pulse of duration directly proportional to the vehicle speed. This pulse is converted to a voltage level which is then averaged with a stored voltage level representing the average speed of preceding vehicles.

It is accordingly an object of the present invention to provide an improved speed averaging circuit.

It is another object of the present invention to provide an improved circuit for indicating the average speed of a number of vehicles which have passed vehicle detection means of the type which produces an output pulse with duration inversely proportional to speed.

It is an additional object of the present invention to provide a speed averaging circuit which is suitable for use with a vehicle detection means of the type that generates a signal during the time a vehicle is within its detection zone and which produces an output directly proportional to the average speed of vehicles passing such a detector.

It is a further object of the present invention to provide a circuit which is suitable for use with a vehicle detection means that provides an output pulse with duration inversely proportional to speed and which indicates the average speed of vehicles passing such a detection means with a high degree of accuracy, particularly in the higher speed ranges.

It is yet another object of the present invention to provide an improved speed averaging circuit which produces an output directly proportional to the average of the speeds indicated by the input signals applied to it.

It is a general object of the present invention to provide an improved speed averaging circuit for use in traffic control systems.

These and other objects and advantages will be apparent in the subject invention from following detailed description and claims, when taken in conjunction with the accompanying drawings in which like parts are designated by like numerals.

BRIEF DESCRIPTION OF DRAWINGS

FIGURES 3a and 3b depict a schematic diagram of the same preferred embodiment of the present invention when they are joined together as shown in FIGURE 4.

DESCRIPTION OF A PREFERRED EMBODIMENT

Figure 1:
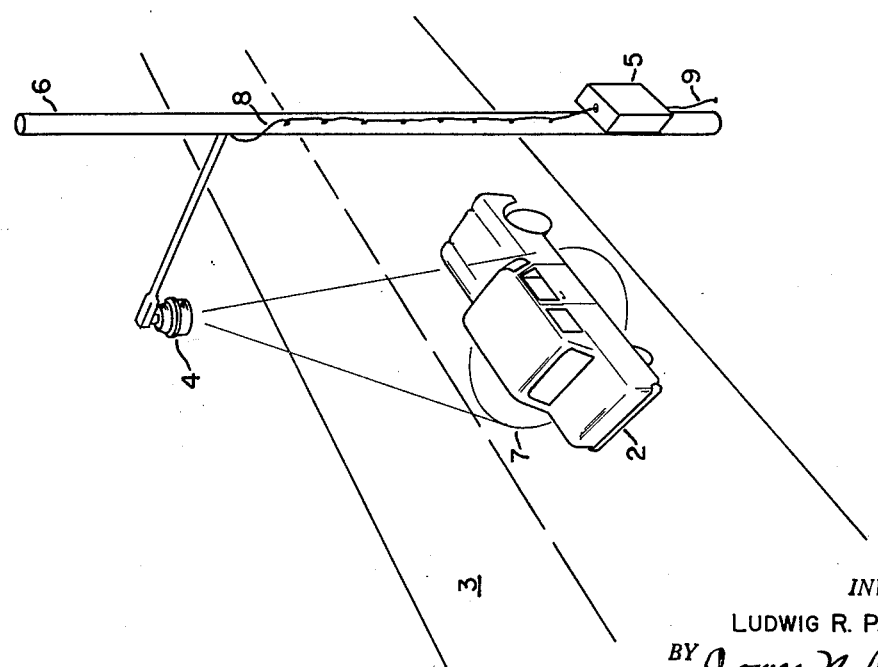
FIGURE 1 is a fragmentary perspective view of a vehicle detector, in relation to a roadway with a vehicle thereon, adapted for use as an input device for the present invention.

FIGURE 1 depicts a vehicle 2 travelling on a roadway 3 which is monitored by a sonic detector made up of sonic transducer 4 and electronic equipment mounted within terminal box 5. For example, this sonic detector may be as described in the aforementioned copending application 551,692. Sonic transducer 4 is supported over roadway 3 from a pole 6 at the side of the roadway; for example, over the right-hand side of a roadway on a road on which traffic drives on the right. The transducer 4 is of the pulse-echo type which emits pulses of sonic waves of a frequency higher than that which can be heard by a human ear; for example, a frequency within the range of 18,000 to 20,000 cycles-per-second. These sonic wave pulses strike the roadway 3 in an elliptical radiation pattern 7, and they are reflected back to transducer 4. When vehicle 2 is within elliptical pattern 7, the change in the distance travelled by the pulses, from the transducer 4 to the reflecting surface and back to the transducer, causes an output from transducer 4. This output lasts for as long as vehicle 2 is within the detection zone defined by elliptical radiation pattern 7. Thus, if all vehicles passing through pattern 7 are identical, the duration of the output is inversely proportional to the vehicle speed.

Variations in vehicle size introduce errors in this speed indication. Additionally, radiation in the fringes of the detection zone of pattern 7 is reflected by sloping surfaces of a vehicle before and after the vehicle is actually within pattern 7. The distance outside of pattern 7 over which this reflection occurs is dependent, in part, upon such things as the height and width of the vehicle and the degree of sloping of the surfaces on the vehicle, such as the windshield on vehicle 2. Consequently, the duration of each output from the sonic detector of FIGURE 1 is primarily related to the speed of the corresponding vehicle passing through the detection zone of radiation pattern 7, but it is also somewhat dependent upon such things as the vehicle size and shape. The output from transducer 4 is transmitted via cable 8 to the electronic equipment within terminal box 5 which is mounted on the side of pole 6, for example.

The signal from transducer 4, after passing through the circuitry within terminal box 5, is transmitted by conductor 9 to the speed averaging circuitry of the present invention, which may be housed in a remote location. Preferably, the circuitry within terminal box 5 transforms the output from transducer 4 to a D.C. pulse waveform. For example, terminal box 5 may contain suitable electronics and electro-mechanical equipment which results in a relay contact closure to ground when a vehicle passes through the detection pattern 7 of transducer 4. In such a case, during the time that no vehicle is passing through the radiation pattern 7, a voltage is present on line 9 which connects to low-pass filter 10 of FIGURES 2 and 3. When a vehicle such as vehicle 2 enters radiation pattern 7, a relay contact closure within terminal box 5 causes the potential on line 9 to drop to approximately ground potential, and so a negative-going pulse occurs at low-pass filter 10.

Obviously other detector devices can be utilized in place of the sonic detector of FIGURE 1. For example, an inductive loop detector could be utilized, such as the aforementioned wire loop and Model LD-1 Loop Vehicle Detector. The wire loop would be imbedded in roadway 3 and connected to circuitry within terminal box 5 to provide an indication each time a vehicle passes over the loop.

Alternatively, two pressure sensitive vehicle detectors can be utilized to provide an output pulse during the time a vehicle is traversing the distance between them, as aforementioned. In such a case, a vehicle is "within the detection zone" of the two pressure sensitive vehicle detectors during the time that the front axle of the vehicle is travelling from the first vehicle detector to the second.

Additionally, the circuitry within terminal box 5 could be selected to give a positive-going pulse output when a vehicle activates the detector. Any one of numerous detectors could be utilized to provide a pulse on conductor 9 having a duration determined by the length of time that a vehicle is within its detection zone.

Figure 2:
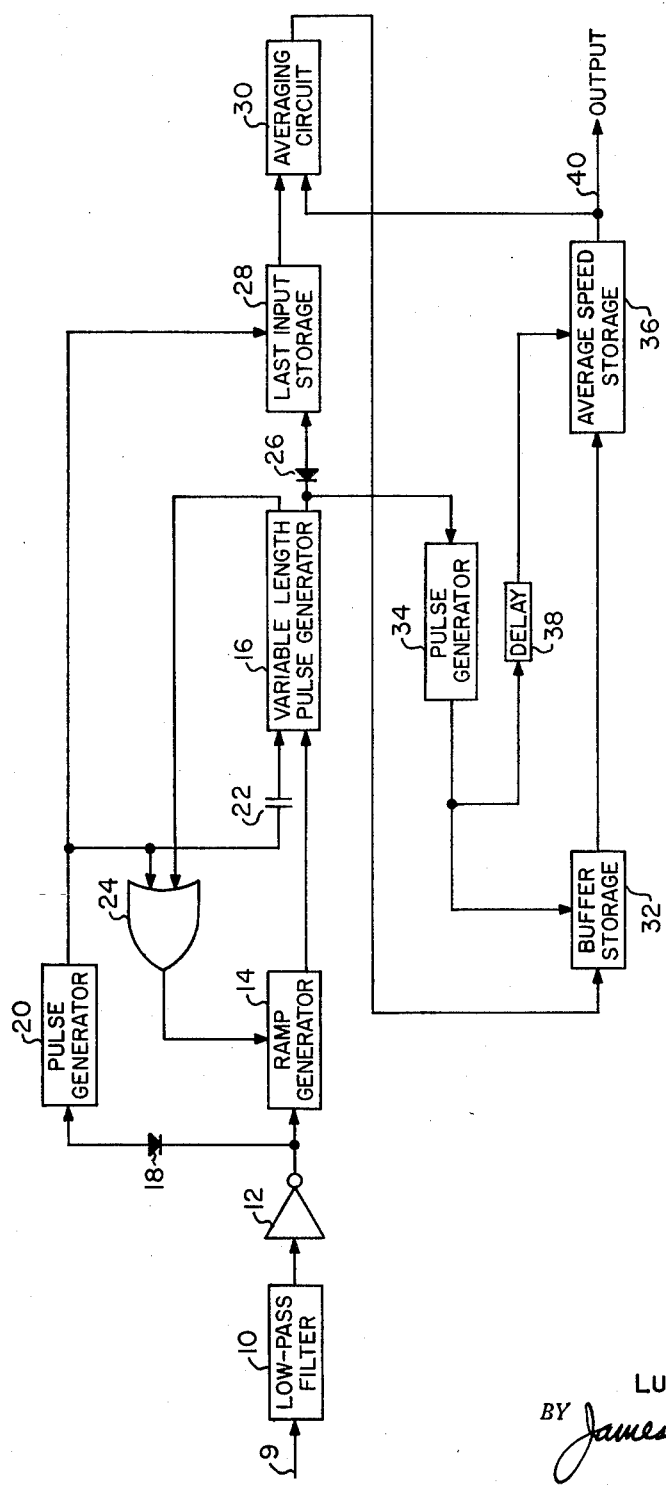
FIGURE 2 is a block diagram of a preferred embodiment of the present invention.

FIGURE 2 depicts in block diagram form a preferred embodiment of the electronic circuitry of the present invention. Input pulses from a vehicle detector such as the sonic detector of FIGURE 1 are applied via line 9 to low pass filter 10, from which they pass through inverting amplifier 12 to ramp generator 14. Filter 10 removes spurious high frequency pulses due to such things as noise or relay contact bounce, which otherwise would cause erroneous output signals from the circuit. The output of ramp generator 14 is a voltage level proportional to the duration of the input pulse. This output is connected to the control input of variable-length pulse generator 16. The amplifier 12 output is also connected to the cathode of diode 18 which has its anode tied to the input of pulse generator 20, so that pulse generator 20 is triggered when the input pulse terminates. The output of pulse generator 20 is connected through capacitor 22 to the trigger input a variable-length pulse generator 16.

Pulse generator 16 is activated by negative-going pulses applied to it through capacitor 22 when the output pulse from generator 20 terminates, and the pulse generator 16 output is a pulse having a duration determined by the level of the voltage applied to the control input of variable length pulse generator 16 from ramp generator 14. The pulse generator 16 output is available at two output terminals. The first terminal provides a positive pulse when the generator 16 is triggered. The output from the second terminal is inverted from the first terminal output, and so the second output terminal provides a negative pulse when the pulse generator 16 is triggered.

The first output of pulse generator 16 is tied to the first input of OR gate 24, which has its second input connected to the output of pulse generator 20. The output of OR gate 24 is tied to the control input of ramp generator 14 so that a signal applied by OR gate 24 clamps the ramp generator, causing its output voltage to be maintained at the level which it has reached when the control input is applied.

The second output from variable-length pulse generator 16 is connected to the cathode of diode 26, which has its anode tied to the signal input of storage unit 28. Storage unit 28 generates and stores a voltage indicative of the speed of the last vehicle to pass transducer 4. The output of pulse generator 20 is connected to storage unit 28, so that storage unit 28 is reset when pulse generator 20 is triggered. The output of storage unit 28 is applied to the first input of averaging circuit 30, the output of which is connected to the signal input of buffer storage unit 32. The second output from variable length pulse generator 16 is connected to the input of pulse generator 34, the output of which is tied to the trigger input of buffer storage unit 32. The output of buffer storage unit 32 is connected to the input of average speed storage unit 36. The output of pulse generator 34 is applied through delay unit 38 to the trigger input of average speed storage unit 36.

The output of storage unit 36 is a voltage representing the average speed of the vehicles which have passed transducer 4. This voltage is the circuit output signal, and it is applied via output line 40 to the second input of averaging circuit 30 and to appropriate indicating and utilizing equipment (not shown).

Figure 3A:
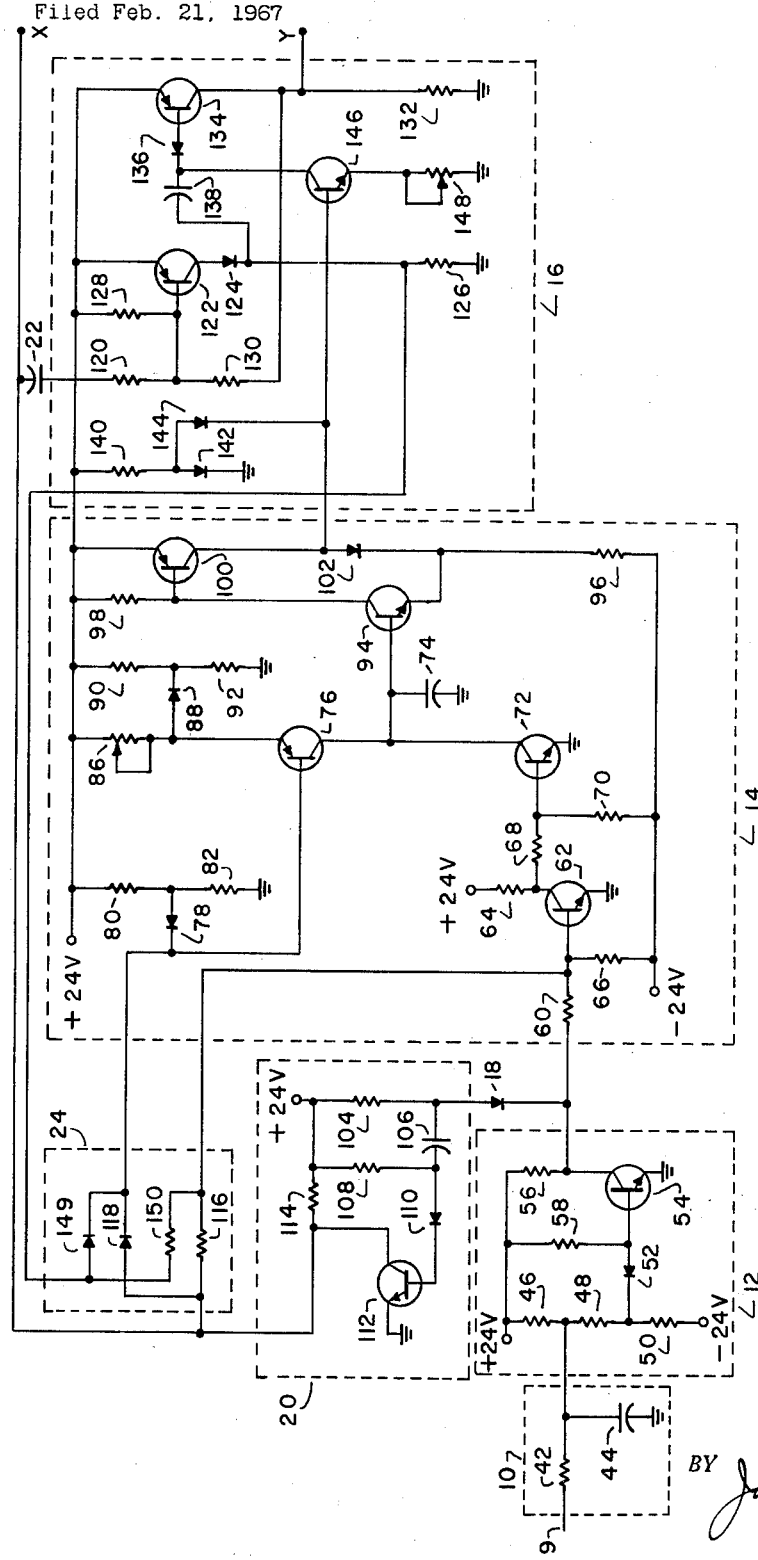

When FIGURES 3a and 3b are joined together as shown in FIGURE 4, connecting points X and X' together and points Y and Y' together, they comprise FIGURE 3 which depicts the detailed circuitry of a form of the preferred embodiment of the invention. Pulses from a vehicle detector, such as the sonic detector of FIGURE 1, are applied via input line 9 to one end of resistor 42 within low-pass filter 10. The other end of resistor 42 is connected to the first plate of capacitor 44, which has its second plate grounded. The first plate of capacitor 44 is coupled through resistor 46, within amplifier 12, to a source of positive potential, such as +24 volts D.C. The first plate of capacitor 44 is also tied within amplifier 12 to one side of resistor 48, which has its other side coupled through resistor 50 to a source of negative potential, such as —24 volts D.C. The junction of resistors 48 and 50 is connected to the cathode of diode 52, which has its anode tied to the base of NPN transistor 54. Transistor 54 has its emitter grounded and its collector coupled through resistor 56 to the positive voltage source. The base of transistor 54 is coupled through resistor 58 to the source of positive voltage.

The output from amplifier 12 is taken from the collector of transistor 54, which is coupled through resistor 60 to the base of NPN transistor 62 within ramp generator 14. Transistor 62 has its emitter tied to ground, its collector coupled through resistor 64 to the source of positive potential, and its base coupled through resistor 66 to the source of negative potential. The collector of transistor 62 is coupled through serially connected resistors 68 and 70 to the source of negative potential. The junction of resistors 68 and 70 is tied to the base of NPN transistor 72, which has its emitter grounded and its collector connected to the first plate of capacitor 74, the second plate of which is grounded.

The first plate of capacitor 74 is also connected to the collector of PNP transistor 76, which has its base tied to the cathode of diode 78. The anode of diode 78 is connected to the junction of resistors 80 and 82 which form a voltage divider between the source of positive potential and ground. The emitter of transistor 76 is coupled through rheostat 86 to the source of positive voltage. The emitter of transistor 76 is also connected to the anode of diode 88, which has its cathode tied to the junction of resistors 90 and 92. Resistors 90 and 92 form a voltage divider between the source of positive potential and ground.

The first plate of capacitor 74 is tied to the base of NPN transistor 94, which has its emitter coupled through resistor 96 to the source of negative voltage. The collector of transistor 94 is coupled through resistor 98 to the source of positive potential and is connected to the base of PNP transistor 100. Transistor 100 has its emitter tied to the source of positive potential and its collector tied to the cathode of diode 102. The anode of the diode 102 is tied to the emitter of transistor 94.

When transistor 72 is cut-off, transistor 76, together with its biasing circuitry, constitutes a constant-current source between the source of positive potential and capacitor 74. Thus, the charge on capacitor 74 is determined by the length of time which transistor 72 is cut-off. Transistors 94 and 100, together with resistors 96 and 98 and diode 102, constitute an impedance converter, so that the voltage on the anode of diode 102 is substantially the same as the voltage on capacitor 74.

The collector of transistor 54 within amplifier 12 is coupled through diode 18 to one end of resistor 104 and to the first plate of capacitor 106 within pulse generator 20. The other end of resistor 104 is tied to the source of positive potential. The second plate of capacitor 106 is connected to one side of resistor 108 and to the anode of diode 110. The other side of resistor 108 is tied to the positive voltage source. The cathode of diode 110 is connected to the base of NPN transistor 112. Transistor 112 has its emitter tied to ground and its collector coupled through resistor 114 to the positive voltage source.

The output from pulse generator 20 is taken from the collector of transistor 112, which is connected within OR gate 24 to one side of resistor 116 and to the anode of diode 118. The other side of resistor 116 is tied to the base of transistor 62 within ramp generator 14, while the cathode of diode 118 is tied to the base of transistor 76 within ramp generator 14.

The collector of transistor 112, within pulse generator 20, is coupled through capacitor 22 and resistor 120 to the base of PNP transistor 122 within variable-length pulse generator 16. Transistor 122 has its emitter tied to the source of positive potential and its collector connected to the anode of diode 124. The cathode of diode 124 is coupled through resistor 126 to ground. The base of transistor 122 is coupled through resistor 128 to the source of positive potential and is coupled through serially connected resistors 130 and 132 to ground.

PNP transistor 134 within pulse generator 16 has its emitter tied to the source of positive potential, its collector tied to the junction of resistors 130 and 132, and its base tied to the anode of diode 136. The cathode of diode 136 is coupled through capacitor 138 to the cathode of diode 124.

Resistor 140 has its first end connected to the source of positive potential and its second end connected to the anode of diode 142, the cathode of which is grounded. The junction of resistor 140 and diode 142 is connected to the anode of diode 144, the cathode of which is connected to the anode of diode 102 within ramp generator 14. The anode of diode 102 is connected within variable-length pulse generator 16 to the base of NPN transistor 146, which has its collector connected to the junction of diode 136 and capacitor 138. The emitter of transistor 146 is coupled through rheostat 148 to ground.

Transistors 122 and 134 are thus connected as a monostable multivibrator or one-shot, with transistor 146 forming a variable impedance between one side of capacitor 138 and ground. In the stable state, transistor 122 is cut-off and transistor 134 is in saturation. When a positive pulse is applied through capacitor 22 and resistor 120 to the base of transistor 122, no change occurs because transistor 122 is already cut-off. A negative pulse through capacitor 22 and resistor 120 causes the one-shot to assume its unstable state by turning on transistor 122, raising the voltage on its collector to substantially the level of the positive voltage source. This causes transistor 134 to cut-off, and the voltage at its collector drops to a low level. The length of time which the one-shot remains in this unstable state is dependent upon the rate at which current flows through transistor 146 to capacitor 138. This current varies with the voltage applied to the base of transistor 146, which, in turn, is dependent upon the voltage on capacitor 74 within ramp generator 14. As the voltage on capacitor 74 increases, transistor 146 conducts more heavily, increasing the current flow to capacitor 138, and reducing the length of time that the one-shot is in its unstable state.

While FIGURE 3 depicts use of an NPN transistor 146 as the variable impedance in the timing circuit of the one-shot multivibrator within variable-length pulse generator 24, other devices could be utilized in place of NPN transistor 146. For example, the NPN transistor could be replaced by a field-effect transistor. Alternatively, the anode of diode 102 could be connected to a heat source or to a light source, with a heat sensitive or a light sensitive resistor coupled between ground and capacitor 138 in place of the collector-emitter circuit of transistor 146. It is required that the time constant of the one-shot decrease as the voltage on capacitor 74 increases.

The cathode of diode 124 within variable-length pulse generator 16 is connected to the anode of diode 149 and to the first side of resistor 150 within OR gate 24. The cathode of diode 149 is connected to the base of transistor 76, and the second side of resistor 150 is tied to the base of transistor 62, both within ramp generator 14.

The collector of transistor 134 within variable-length pulse generator 16 is coupled through diode 26 to the base of PNP transistor 151 in storage unit 28. The collector of transistor 151 is tied to the first plate of capacitor 152, the second plate of which is grounded. Transistor 151 has its emitter coupled through rheostat 154 to the positive voltage source. The emitter of transistor 151 is also connected to the anode of diode 156. The cathode of diode 156 is tied to the junction of resistor 158 and 160, which form a voltage divider between the positive voltage source and ground. The base of transistor 151 is connected to the cathode of diode 161. The anode of diode 161 is tied to the junction of resistors 162 and 163, which form a voltage divider between the positive voltage source and ground.

The first plate of capacitor 152 is connected to the base of NPN transistor 164, which has its emitter tied to the cathode of diode 165, the anode of which is grounded. The collector of transistor 164 is coupled through resistor 166 to the positive voltage source. The collector of transistor 164 is also connected to the base of PNP transistor 168, which has its emitter tied to the positive voltage source and its collector connected to the anode of diode 169. The cathode of diode 169 is tied to the emitter of transistor 164 and is coupled through resistor 170 to the negative voltage source.

The first plate of capacitor 152 is tied to the collector of NPN transistor 171, which has its emitter tied to ground and its base coupled through resistor 172 to the negative voltage source. The base of transistor 171 is also coupled through resistor 173 to the collector of transistor 112 within pulse generator 20.

Resistors 158, 160, 162 and 163 are selected so that with the one-shot within pulse generator 16 in its stable state, transistor 151 is cut-off. When the one-shot is in its unstable state, it pulls the base of transistor 151 to a low voltage level, and so transistor 151 turns on to saturation. In this condition transistor 151, together with its biasing circuitry, operates as a constant-current source. If transistor 171 is cut-off, the current through transistor 151 charges capacitor 152. The charge on capacitor 152 is thus proportional to the length of time that the one-shot in variable-length pulse generator 16 is in its unstable state, provided transistor 171 is cut-off. Transistors 164 and 168, together with resistors 166 and 170 and diodes 165 and 169, operate as an impedance converter, and the voltage at the anode of diode 169 is substantially the same as the voltage on capacitor 152.

The anode of diode 169 is connected to resistor network 174 within averaging circuit 30. In the representative example depicted in FIGURE 3, resistor network 174 is made up of the serially connected resistors 174a, 174b, 174c, 174d, 174e, 174f and 174g. Multi-position switch 176 has contacts 176a, 176b, 176c, 176d, 176e, 176f and 176g, in the example of FIGURE 3. The anode of diode 169 is coupled to the first end of resistor 174a, at one end of resistor network 174. Switch contact 176a is tied to the junction of resistors 174a and 174b; switch contact 176b is tied to the junction of resistors 174b and 174c; switch contact 176c is tied to the junction of resistors 174c and 174d; switch contact 176d is tied to the junction of resistors 174d and 174e; switch contact 176e is tied to the junction of resistors 174e and 174f; switch contact 176f is tied to the junction of resistors 174f and 174g; and switch contact 176g is tied to the remaining end of resistor 174g. The arm of switch 176 connects through resistor 178 to the circuit output line 40 from storage unit 36.

The several positions of multi-position switch 176 correspond to the number of vehicles over which the average vehicle speed is to be weighted. In the illustrative example depicted in FIGURE 3, these switch positions 176a through 176g are respectively designated 3, 5, 7, 10, 15, 20 and 30. Resistor 174a, which ties contact 176a, the three-vehicle position of switch 176 to the anode of diode 169, is a 20,000 ohm resistor. Resistor 174b which is connected between the three-vehicle position and the five-vehicle position of the switch 176 in a 20,000 ohm resistor. Similarly, resistor 174c, between the five-vehicle and the seven-vehicle positions of switch 176, is a 20,000 ohm resistor. Resistor 174d, connecting the seven-vehicle and the ten-vehicle positions of switch 176, is a 30,000 ohm resistor, and resistors 174e and 174f, which respectively connect the ten-vehicle position to the fifteen-vehicle position of switch 176 and the fifteen-vehicle position to the twenty-vehicle position of switch 176, are each 50,000 ohm resistors. Resistor 174g, connecting the twenty-vehicle and the thirty-vehicle positions of switch 176, is a 100,000 ohm resistor. Resistor 178, which connects the circuit output line 40 to the arm of switch 176, is a 10,000 ohm resistor.

The voltage on the anode of diode 169 represents the speed of the last vehicle which passed the vehicle detector of FIGURE 1, and the voltage on output line 40 represents the stored average speed of preceding vehicles. The difference between these voltages is divided between resistor 178 and the resistors of network 174 which are placed in the circuit by switch 176. With the arm of switch 176 in the "5" position, as shown in the representative example of FIGURE 3, resistors 174a and 174b provide 40,000 ohms resistance between the anode of diode 169 and the arm of switch 176, and resistor 178 places 10,000 ohms resistance between the arm of switch 176, and output line 40. Therefore, four-fifths of the voltage difference is dropped across resistors 174a and 174b, while the other one-fifth is dropped across resistor 178. Consequently, the voltage on the arm of switch 176 represents the weighted average of the speed of the last vehicle and the stored average speed of preceding vehicles. The weighting factor represents the number of vehicles over which the averaging is done and is shown by the position of the arm of switch 176. Thus, in the illustrative example depicted in FIGURE 3, the voltage on the arm of switch 176 represents the speed of the last vehicle averaged with four parts of the average speed of preceding vehicles. This voltage represents the new average vehicle speed, including the speed of the last vehicle.

The collector of transistor 134 within variable-length pulse generator 16 is connected to the cathode of Zener diode 180 in pulse generator 34. The anode of Zener diode 180 is coupled through resistor 182 to the negative voltage source. The anode of Zener diode 180 is also tied to the base of NPN transistor 184, which has its emitter grounded and its collector coupled through resistor 186 to the positive voltage source.

The collector of transistor 184 is tied to the cathode of diode 188. Diode 188 has its anode connected to one end of resistor 190 and to the first plate of capacitor 192. The other end of resistor 190 is tied to the positive voltage source. The second plate of capacitor 192 is coupled through resistor 194 to the positive voltage source, and it is tied to the anode of diode 196. The cathode of diode 196 is connected to the base of NPN transistor 198, which has its emitter grounded and its collector coupled through resistor 200 to the positive voltage source.

The collector of transistor 198 is connected to the first side of the coil of relay 202 within buffer storage unit 32. The other side of the coil of relay 202 is grounded. Armature 202a of relay 202 is tied to the first plate of capacitor 204, the second plate of which is grounded. Normally open contact 202b of relay 202 is connected to the arm of switch 176 within averaging circuit 30. The first plate of capacitor 204 is connected to the base of NPN transistor 206 which has its emitter coupled through resistor 208 to the negative voltage source and its collector coupled through resistor 210 to the positive voltage source. The collector of transistor 206 is also connected to the base of PNP transistor 212, which has its emitter tied to the positive voltage source and its collector connected to the anode of diode 214. The cathode of diode 214 is tied to the emitter of transistor 206. Transistors 206 and 212, together with resistors 208 and 210 and diode 214, operate as an impedance converter, and so the voltage on the anode of diode 214 is substantially the same as the voltage on capacitor 204.

The collector of transistor 198 in pulse generator 34 is connected to the cathode of diode 218 in delay circuit 38. The anode of diode 218 is coupled through resistor 220 to the positive voltage source and is connected to the first plate of capacitor 222. The second plate of capacitor 222 is coupled through resistor 224 to the positive voltage source and is connected to the anode of diode 226. The cathode of diode 226 is tied to the base of NPN transistor 228, which has its emitter grounded and its collector coupled through resistor 230 to the positive voltage source.

The collector of transistor 228 is connected to one side of the coil of relay 232, within storage unit 36. The other side of the relay coil is grounded. The armature 232a of relay 232 is coupled through resistor 233 to the anode of diode 214 within buffer storage unit 32. Normally-open contact 232b of relay 232 is connected to the first plate of capacitor 234, the second plate of which is tied to ground. The first plate of capacitor 234 is also connected to the base of NPN transistor 235, which has its emitter coupled through resistor 236 to the negative voltage source and its collector coupled through resistor 238 to the positive voltage source. The collector of transistor 235 is also connected to the base of PNP transistor 240, which has its emitter tied to the positive voltage source and its collector connected to the anode of diode 242, the cathode of which is tied to the emitter of transistor 235. The collector of transistor 240 is also coupled through the fixed resistance of potentiometer 244 to the emitter of transistor 235. The arm of potentiometer 244 is connected to output line 40, which provides the circuit output signal and which, as described above, is connected through resistor 178 to the arm of switch 176 within averaging circuit 30.

Transistors 235 and 240, together with resistors 236 and 238 and diode 242, act as an impedance converter, and so the voltage on the anode of diode 242 is substantially the same as the voltage on base of transistor 235. Consequently, the voltage on the arm of potentiometer 244 is substantially the same as that on capacitor 234, which represents the average vehicle speed. Connection of output line 40 to the arm of potentiometer 244 rather than directly to the anode of diode 242 permits minor calibrating adjustments to be made in the output voltage to insure the circuit accuracy.

In FIGURE 3 the circuit output line 40 is depicted as connecting to an indicating circuit, by way of example. Thus, output line 40 is tied to the base of NPN transistor 246, which has its emitter grounded through resistor 248. The collector of transistor 246 is tied to the base of PNP transistor 250, the emitter of which is tied to the positive voltage source. The collector of transistor 250 is tied to the anode of diode 252, which has its cathode connected to the emitter of transistor 246. The collector of transistor 250 is also coupled to the emitter of transistor 246 through the fixed resistance of potentiometer 254. The arm of potentiometer 254 is connected to a suitable indicating instrument, shown by way of example in FIGURE 3 as voltmeter 256, which has its other terminal grounded. Transistors 246 and 250, together with resistor 248 and diode 252, operate as an impedance converter, and so the reading on meter 256 is an indication of the voltage on output line 40. The scale on meter 256 can, of course, be calibrated to read directly in average speed. Again, connection of meter 256 to the arm of potentiometer 254 rather than to the anode of diode 252 permits minor calibrating adjustments to be made to insure the accuracy of the meter readings.

When the speed averaging circuit of the present invention is utilized as part of a traffic control system, then the arm of potentiometer 254 is connected to the other components of the system to which an average speed indication is to be applied. The impedance converter comprising transistors 246 and 250 is utilized to prevent loading the output signal on line 40 which must be applied to averaging circuit 30.

OPERATION OF THIS EMBODIMENT

When there is no vehicle within the detection zone of the vehicle detector connected to line 9, the voltage on capacitor 44 is a positive voltage determined by resistors 46, 48 and 50. Transistors 54 and 112 are turned on, and the one-shot multivibrator within variable-length pulse generator 16 is in its stable state in which transistor 122 is cut-off and transistor 134 is turned on. As a consequence, transistor 62 within ramp generator 14, is cut-off, and transistor 72 is conducting. Current flows through the constant current generator, comprising transistor 76 and its biasing circuitry, to ground through transistor 72, and so there is no voltage built up on capacitor 74. Transistors 151 and 171 within storage unit 28 are cut-off, and the voltage on capacitor 152 represents the speed of the last vehicle which has passed the vehicle detector. If switch 176 is in the "5" position, as depicted in the representative example of FIGURE 3, then both the voltage on the arm of switch 176 and the voltage on capacitor 234 represent the average speed of the last five vehicles which have passed the vehicle detector. Transistors 184 and 198 within pulse generator 34 are conducting, as is transistor 228 within delay unit 38. Consequently, relays 202 and 232 are de-energized.

When a vehicle comes within the detection zone of the vehicle detector, such as the sonic detector of FIGURE 1, ground is applied to line 9 by the electronic circuitry which is associated with the detector and which is within terminal box 5. As a consequence, transistor 54, within inverting amplifier 12, is turned off, and so its collector voltage increases. Capacitor 106, within pulse generator 20, passes a positive voltage spike through diode 110 to the base of transistor 112. Since transistor 112 is already conducting, this voltage spike has no effect. The positive voltage on the collector of transistor 54 acts through resistor 60 to turn on transistor 62 within ramp generator 14. This causes transistor 72 to cut-off, and so the current from the constant current generator comprising transistor 76 and its biasing circuitry is applied to the first plate of capacitor 74. So long as the vehicle is within the detection zone of the vehicle detector, ground remains on line 9, and the current through transistor 76 is applied to capacitor 74, increasing the voltage on the capacitor.

When the vehicle is no longer within the detection zone of the vehicle detector, ground is removed from line 9 and transistor 54 again turns on. The voltage on the collector of transistor 54 decreases, and a negative pulse is applied from capacitor 106 through diode 110 to the base of transistor 112, shutting off that transistor. The collector voltage of transistor 112 increases, and this positive voltage is applied through resistor 116 to the base of transistor 62, maintaining transistor 62 in conduction, even though the collector of transistor 56 has again gone negative. As a consequence, transistor 72 remains cut-off. The positive voltage on the collector of transistor 112 also passes through diode 118 to the base of transistor 76, cutting off that transistor and stopping current flow to capacitor 74. Capacitor 74 is isolated, and so the voltage on capacitor 74 is clamped at the level which it had reached when the pulse from the vehicle detector terminated. This voltage on capacitor 74 is applied through the impedance converter comprising transistors 94 and 100 and diode 102 to the base of transistor 146 within variable length pulse generator 16.

The positive voltage pulse, occurring on the collector of transistor 112 when it is cut off, is applied through capacitor 22 and resistor 120 to the base of transistor 122, within pulse generator 16. Since transistor 122 is already cut off, this positive pulse has no effect. The length of time which transistor 112 remains cut off depends upon the values of capacitor 105 and resistor 108.

When the voltage at the junction of capacitor 105 and diode 110 has returned to a high level, transistor 112 again turns on. As a consequence, the collector voltage of transistor 112 drops, and a negative pulse is applied through capacitor 22 and resistor 120 to the base of transistor 122 within variable length pulse generator 16. This turns on transistor 122 and turns off transistor 134, placing the one-shot multivibrator within pulse generator 16 in its unstable state. The collector voltage of transistor 122 increases, and this positive voltage is applied through diode 124 to OR gate 24. The positive voltage passes through resistor 150 to the base of transistor 62 and through diode 149 to the base of transistor 76 within ramp generator 14. As a consequence, transistors 72 and 76 remain cut-off, and so capacitor 74 is still isolated, maintaining its voltage level.

The timing circuit which determines how long the one-shot multivibrator within pulse generator 16 remains in its unstable state includes the impedance of the collector-emitter circuit of transistor 146. The degree of conduction of transistor 146, and hence the impedance which it presents in this timing circuit, is determined by the voltage on capacitor 74. The voltage on capacitor 74, in turn, in determined by the length of time which ground has been applied on line 9, due to a vehicle within the detection zone of the vehicle detector. The voltage on capacitor 74 is thus inversely proportional to the speed of the vehicle passing the vehicle detector. If a vehicle passes the detector at a low speed, the negative (ground) pulse applied on line 9 is of a long duration. Consequently, the voltage on capacitor 74 increases to a high level, and transistor 146 presents a low impedance. Therefore, the one-shot remains in its unstable state only a short time. If a vehicle passes the detector at a high speed, a short duration negative (ground) pulse is applied on line 9. The voltage on capacitor 74 reaches only a low level by the time it is clamped, and so transistor 146 presents a high impedance. Therefore, the one-shot remains in its unstable state a long time. Thus, the length of time which the one-shot multivibrator remains in its unstable state is directly proportional to the speed of the vehicle which has passed the vehicle detector.

When the one-shot goes to its unstable state and transistor 134 cuts off, the voltage on the collector of transistor 134 drops. As a consequence, the voltage on the base of transistor 184 drops, and so transistor 184 cuts off. The voltage on the collector of transistor 184 increases, and a positive pulse is passed through diode 188, capacitor 192 and diode 196 to the base of transistor 198. Since transistor 198 is already conducting, this positive pulse has no effect.

The positive voltage pulse, occurring on the collector of transistor 112 when it is cut off, is applied through resistor 173 to the base of transistor 171 within storage unit 28. This turns on transistor 171, shunting capacitor 152 to ground. Discharge of capacitor 152 resets storage unit 28. When transistor 112 again turns on, transistor 171 is cut off, isolating capacitor 152 and preparing storage unit 28 to receive and to store the next vehicle speed indication.

When the one-shot multivibrator within variable length pulse generator 16 assumes its unstable state, transistor 134 turns off and so the voltage on its collector drops. This voltage drop is applied to the base of transistor 151 within storage unit 28, turning on transistor 151. Transistor 151 and its biasing circuitry operate as a constant current source, applying current to capacitor 152, for so long as the one-shot multivibrator is in its unstable state. When the one-shot returns to its stable state, transistor 151 cuts off and capacitor 152 is isolated, thereby clamping its voltage at the level it has reached at that time. Consequently, the voltage on capacitor 152 is proportional to the length of time which the one-shot has been in its unstable state. Thus, the voltage on capacitor 152 is directly proportional to the speed of the vehicle which has passed the vehicle presence detector.

The voltage on capacitor 152 is applied through the impedance converter, comprising transistors 164 and 168 and diode 169, to resistor network 174. Simultaneously, the voltage on capacitor 234, within average speed storage unit 36, is applied through transistors 235 and 240 to output line 40 and to resistor 178. Since switch 176 is in its "5 Vehicle" position, the voltage on the arm of switch 176 is made up of one part of the voltage from capacitor 152 and four parts of the old average speed indicating voltage on capacitor 234. This voltage on arm 176 represents the average speed of the last five vehicles to pass the vehicle detector, including that vehicle which has just had its speed measured.

The average speed indicating voltage on the arm of switch 176 is applied to normally-open relay contact 202b within buffer storage unit 32. When the one-shot multivibrator within variable length pulse generator 16 returns to its stable state, the voltage on the collector of transistor 134 increases. This increase in voltage is applied through Zener diode 180 to the base of transistor 184 within pulse generator 34, turning on transistor 184. As a consequence, the voltage on the collector of transistor 184 drops, and a negative pulse passes through diode 188, capacitor 192, and diode 196 to the base of transistor 198, cutting off transistor 198. The voltage on collector of transistor 198 then increases, energizing relay coil 202. Armature 202a closes against normally-open contact 202b, and so the voltage on the arm of switch 176 is bucketed into capacitor 204. The positive voltage pulse, occurring on the collector of transistor 198 when it cuts off, is applied through diode 218, capacitor 222 and diode 226 to the base of transistor 228 within delay unit 38. Since transistor 228 is conducting, this positive pulse has no effect.

The length of time that transistor 198 remains cut off depends upon the values of capacitor 192 and resistor 194. When transistor 198 again turns on, its collector voltage drops, de-energizing relay 202 and causing armature 202a to move away from normally-open contact 202b. As a consequence, capacitor 204 is isolated. The voltage on capacitor 204 represents the new average speed. This voltage is applied through the impedance converter, comprising transistors 206 and 212, to the anode of diode 214.

When the collector voltage of transistor 198 drops, a negative pulse is applied through diode 218, capacitor 222 and diode 226 to the base of transistor 228, causing transistor 228 to turn off. This increases the voltage on the collector of transistor 228 and energizes relay 232. As a consequence, armature 232a closes against normally-open contact 232. The voltage on the anode of diode 214 is then bucketed into capacitor 234. The length of time which relay 232 remains energized depends upon the values of resistor 224 and capacitor 222, as well as upon the characteristics of relay 232. When the relay drops out, armature 232a moves from normally-open contact 232b, and so capacitor 234 is isolated.

The voltage on capacitor 234, which is the new average speed indication, is applied through the impedance converter, comprising transistors 235 and 240, to circuit output line 40. Thus the voltage on circuit output line 40 represents the new average speed value. This voltage on line 40 can be applied through transistors 246 and 250 to other components in a traffic control system and to an indicating instrument, represented in FIGURE 3 by voltmeter 256.

Once the one-shot multivibrator within variable-length pulse generator 16 has returned to its stable state, transistor 62 cuts off, and transistors 72 and 76 turn on, discharging capacitor 74. The circuit is thus reset and ready to receive the next input pulse. The new output voltage representing the up-dated average speed indication is again applied to resistor 178 within averaging circuit 30. As a consequence, the voltage on the arm of switch 176 is altered, but since relay 202 is de-energized, this altered voltage has no effect on the indication.

Figure 5:
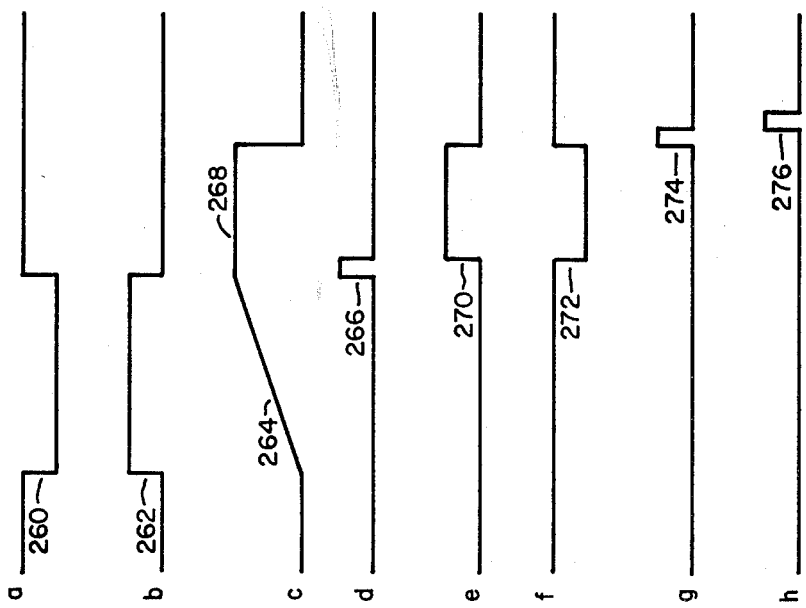
FIGURE 5 depicts waveforms which are found at various points in the preferred embodiment of FIGURES 2 and 3 and which are useful in the explanation of the operation of this embodiment.

FIGURE 5 depicts voltages at various points within the system as a result of a vehicle passing through the detection zone of the vehicle detector. When the vehicle is within the detection zone, negative pulse 260, shown in FIGURE 5a, occurs on line 9 at the input of low-pass filter 10. The output of inverting amplifier 12 is inverted from this and, accordingly, it is shown in FIGURE 5b as positive pulse 262, which exists during the time that the vehicle is within the detection zone. When positive pulse 262 is applied to ramp generator 14, the output voltage of the ramp generator increases, as shown by ramp 264 in FIGURE 5c. Ramp 264 continues to increase for as long as the vehicle is within the detection zone, as indicated by the duration of pulse 262. When pulse 262 ends, pulse generator 20 applies pulse 266, shown in FIGURE 5d, through OR gate 24 to the control input of ramp generator 14. This clamps the ramp generator output voltage at the level which it had reached at that time, shown in FIGURE 5c as level 268. Level 268, accordingly, is inversely proportional to the speed of the vehicle which has passed through the detection zone of the vehicle detector.

When pulse 266 from pulse generator 20 ends, it triggers the one-shot multivibrator within variable-length pulse generator 16. Pulse generator 16 provides two output signals. The first of these is depicted as pulse 270 in FIGURE 5e. This pulse 270 is passed through OR gate 24 to the control input of ramp generator 14 to maintain ramp generator 14 in its clamped condition. Thus, the output of ramp generator 14 remains at voltage level 268.

The second output from variable-length pulse generator 16 is inverted from the first and is depicted in FIGURE 5f as negative pulse 272. The length or duration of pulses 270 and 272 is determined by the length of time which the one-shot multivibrator within variable-length pulse generator 16 has remained in its unstable state. This length of time is inversely proportional to the voltage level 268 applied to the period control input of pulse generator 16 from ramp generator 14. Accordingly, the duration of pulses 270 and 272 is directly proportional to the speed of the vehicle which has passed through the detection zone of the vehicle detector, subject to error due to vehicle size, shape, etc., as discussed above.

Pulse 272 is applied to the last input storage unit 28 to generate a voltage level directly proportional to the duration of pulse 272, and thus directly proportional to the vehicle speed. This voltage level is applied to averaging circuit 30 in which it is averaged with the old average speed indication on output line 40.

When pulse 272 ends, pulse generator 34 applies trigger pulse 274, depicted in FIGURE 5g, to buffer storage unit 32. This causes buffer storage unit 32 to store the output voltage from averaging circuit 30. When trigger pulse 274 ends, delay unit 38 applies trigger pulse 276, FIGURE 5h, to average speed storage unit 36, causing it to store the new average speed indication from buffer storage unit 32. This new average speed indication is applied to averaging circuit 30 for use in averaging the next speed, indication, and it is provided as the system output signal which, by way of example, may be applied to other components within a traffic control system and which may be indicated on meter 256. Should it be desired to obtain an indication of the speed of the last vehicle which has passed the vehicle detector, then the anode of diode 169 can be coupled to an indicating instrument; for example, to the base of transistor 246 in place of the arm of potentiometer 244.

In the event a vehicle detector is used which applies a positive pulse to line 9 during the time that a vehicle is within its detection zone, then inverting amplifier 12 is omitted or is replaced by an amplifier which does not invert the signal applied to it.

It is to be understood that references in the above description to current flow are meant to describe either electron flow from negative potential to positive or conventional current flow from positive potential to negative.

While the preferred use of this invention is in averaging the speed indications of vehicles passing a vehicle detector, this may include any type of motor vehicle, train, aircraft, boat, or other moving object.

Thus, among others, the several objects of the invention, as specifically aforenoted, are achieved. Although the invention has been described with relation to a preferred embodiment thereof, obviously numerous changes in construction and arrangement might be resorted to without departing from the spirit of the invention.

I claim:

1. Apparatus for determining the average speed of objects moving on a surface comprising in combination:
   detection means having a detection zone for a portion of said surface, said detection means generating a signal when an object is within said detection zone, said generated signal having a duration inversely proportional to the speed of said object;
   converting means coupled to said detection means for converting said generated signal to a voltage level inversely proportional to said generated signal duration;
   output means for providing an apparatus output signal;
   voltage averaging means connected to said converting means and to said output means for providing an average voltage proportional to a weighted average of said voltage level and said apparatus output voltage;
   voltage transfer means connected to said voltage averaging means and to said output means for transferring said average voltage to said output means to provide an updated apparatus output voltage.

2. Apparatus for determining the average speed of vehicles on a roadway comprising in combination:
   vehicle detection means having a detection zone for a portion of said roadway, said vehicle detection means generating a detection signal when a vehicle is within said detection zone, said detection signal having a duration inversely proportional to the speed of said vehicle;
   first voltage level generating means coupled to said vehicle detection means for generating a first voltage level proportional to said detection signal duration;
   pulse generating means coupled to said vehicle detection means and connected to said voltage level generating means for generating a voltage pulse having a duration inversely proportional to said first voltage level;
   second voltage level generating means connected to said pulse generating means for generating a second voltage level proportional to said voltage pulse duration;
   output means for providing an output voltage;
   voltage averaging means connected to said second voltage level generating means and to said output means for providing an average voltage level, said average voltage level being a weighted average of said second voltage level and said output voltage;
   voltage transfer means connected to said pulse generating means, to said voltage averaging means, and to said output means for transferring said average voltage level to said output means upon termination of said voltage pulse.

3. Apparatus as claimed in claim 2 in which said pulse generating means includes a monostable multivibrator having a timing circuit including a variable impedance controlled by said first voltage level.

4. Apparatus as claimed in claim 3 in which said variable impedance includes a semiconductor device.

5. Apparatus for determining the average speed of vehicles on a roadway, said apparatus adapted for connection to vehicle detection means having a detection zone for a portion of said roadway, said vehicle detection means generating a detection signal when a vehicle is within said detection zone, said detection signal having a duration inversely proportional to the speed of said vehicle, said apparatus comprising in combination:
   converting means adapted for connection to said vehicle detection means for generating a first voltage level in response to said detection signal, said first voltage level being inversely proportional to said detection signal duration;
   output means for providing an output voltage;
   voltage averaging means connected to said converting means and to said output means for providing an average voltage level, said average voltage level being a weighted average of said output voltage and said first voltage level;
   voltage transfer means connected to said converting means, to said voltage averaging means, and to said output means for transferring said average voltage level to said output means following the generation of said first voltage level.

6. Apparatus for determining the average speed of vehicles on a roadway, said apparatus adapted for connection to vehicle detection means having a detection zone for a portion of said roadway, said vehicle detection means generating a detection signal when a vehicle is within said detection zone, said detection signal having a duration inversely proportional to the speed of said vehicle, said apparatus comprising in combination:
   first voltage level generating means adapted for connection to said vehicle detection means for generating a first voltage level in response to said detection signal, said first voltage level being proportional to said detection signal duration;
   pulse generating means connected to said voltage level generating means and adapted for connection to said vehicle detection means for generating a voltage pulse upon termination of said detection signal, said voltage pulse having a duration inversely proportional to said first voltage level;
   second voltage level generating means connected to said pulse generating means for generating a second voltage level proportional to said voltage pulse duration;
   output means for providing an output voltage;
   voltage averaging means connected to said second voltage level generating means and to said output means for providing an average voltage level, said average voltage level being a weighted average of said second voltage level and said output voltage;
   voltage transfer means connected to said pulse generating means, to said voltage averaging means, and to said output means for transferring said average voltage level to said output means upon termination of said voltage pulse.

7. Apparatus as claimed in claim 6 in which said pulse generating means includes a monostable multivibrator having a timing circuit including a variable impedance controlled by said first voltage level.

8. Apparatus as claimed in claim 7 in which said variable impedance includes a semiconductor device.

9. Apparatus for determining the average speed of vehicles on a roadway, said apparatus adapted for connection to vehicle detection means having a detection zone for a portion of said roadway, said vehicle detection means generating a detection signal when a vehicle is within said detection zone, said detection signal having a duration inversely proportional to the speed of said vehicle, said apparatus comprising in combination:

first voltage level generating means adapted for connection to said vehicle detection means for generating a first voltage level in response to said detection signal, said first voltage level being proportional to said detection signal duration;

first pulse generating means adapted for connection to said vehicle detection means for generating a first pulse upon termination of said detection signal;

second pulse generating means connected to said first voltage level generating means and to said first pulse generating means for generating a second pulse having a duration inversely proportional to said first voltage level upon termination of said first pulse;

said first voltage level generating means coupled to said first and second pulse generating means, so that during the time a pulse is generated by one of said pulse generating means said voltage level generating means retains said first voltage level;

second voltage level generating means connected to said first pulse generating means and to said second pulse generating means for generating a second voltage level proportional to the duration of said second pulse and for being reset upon generation of said first pulse;

voltage averaging means connected to said second voltage level generating means, and to said voltage storage means for providing an average voltage level, said average voltage level being a weighted average of said second voltage level and said output voltage;

voltage transfer means connected to said voltage averaging means and to said voltage storage means;

third pulse generating means connected to said second pulse generating means, to said voltage transfer means, to said voltage averaging means, and to said voltage storage means for applying a first trigger pulse to said voltage transfer means to cause transfer to said voltage transfer means of said average voltage level and for applying to said voltage storage means a second trigger pulse to cause transfer to said voltage storage means of said average voltage level from said voltage transfer means.

10. A speed averaging circuit for use with a traffic control system of the type that controls a traffic right-of-way signal in accordance with traffic conditions on at least one roadway with at least one of said traffic conditions being traffic speed, said speed averaging circuit adapted for connection to vehicle detection means having a detection zone through which at least a portion of said traffic passes, said vehicle detection means generating a signal when a vehicle is within said detection zone, said generated signal having a duration inversely proportional to the speed of said vehicle, said speed averaging circuit comprising in combination:

first voltage level generating means adapted for connection to said voltage detection means for generating a first voltage level in response to said detection signal, said first voltage level being proportional to said detection signal duration;

pulse generating means connected to said voltage level generating means and adapted for connection to said vehicle detection means for generating a voltage pulse upon termination of said detection signal, said voltage pulse having a duration inversely proportional to said first voltage level;

second voltage level generating means connected to said pulse generating means for generating a second voltage level proportional to said voltage pulse duration;

output means adapted for connection to said traffic control system for providing an output voltage;

voltage averaging means connected to said second voltage level generating means and to said output means for providing an average voltage level, said average voltage level being a weighted average of said second voltage level and said output voltage;

said voltage averaging means including control means for controlling the weighting of said weighted average;

voltage transfer means connected to said pulse generating means, to said voltage averaging means, and to said output means for transferring said average voltage level to said output means upon termination of said voltage pulse.

References Cited

UNITED STATES PATENTS

| | | | |
|---|---|---|---|
| 3,082,949 | 3/1963 | Barker | 235—150.24 |
| 3,185,959 | 5/1965 | Barker | 340—38 |
| 3,239,653 | 3/1966 | Barker | 235—150.24 |
| 3,239,805 | 3/1966 | Brockett | 340—31 |
| 3,389,244 | 6/1968 | Brockett | 235—150.24 |
| 3,397,306 | 8/1968 | Auer | 235—150.24 |
| 3,406,395 | 10/1968 | Zupanick | 343—8 |

FOREIGN PATENTS

| | | |
|---|---|---|
| 1,004,415 | 9/1965 | Great Britain. |
| 1,004,417 | 9/1965 | Great Britain. |

MALCOLM A. MORRISON, Primary Examiner

R. W. WEIG, Assistant Examiner

U.S. Cl. X.R.

340—31, 38; 343—8